US011933312B2

(12) United States Patent
Nejedly et al.

(10) Patent No.: US 11,933,312 B2
(45) Date of Patent: Mar. 19, 2024

(54) E-ASSIST TURBOCHARGER WITH BLEED FLUID SYSTEM CONNECTING COMPRESSOR SECTION TO WEB RING OF TURBINE SECTION FOR THRUST LOAD SUPPRESSION

(71) Applicant: Garrett Transportation I Inc, Torrance, CA (US)

(72) Inventors: Milan Nejedly, Brno (CZ); Carlos Chavez Castellanos, Rolling Hill Estates, CA (US); Kristian Dullack, Torrance, CA (US)

(73) Assignee: GARRETT TRANSPORTATION I INC, Torrance, CA (US)

( * ) Notice: Subject to any disclaimer, the term of this patent is extended or adjusted under 35 U.S.C. 154(b) by 149 days.

(21) Appl. No.: 17/247,485

(22) Filed: Dec. 14, 2020

(65) Prior Publication Data

US 2022/0186740 A1 Jun. 16, 2022

(51) Int. Cl.
*F04D 29/051* (2006.01)
*B23P 15/04* (2006.01)
(Continued)

(52) U.S. Cl.
CPC .......... *F04D 29/0513* (2013.01); *B23P 15/04* (2013.01); *F01D 3/04* (2013.01);
(Continued)

(58) Field of Classification Search
CPC ............... F04D 29/0513; F04D 29/051; F04D 29/2266; F04D 29/041; F01D 3/04;
(Continued)

(56) References Cited

U.S. PATENT DOCUMENTS 4,472,107 A * 9/1984 Chang ................. F04D 29/0513
415/170.1
4,581,300 A * 4/1986 Hoppin, III ............ B23K 20/00
416/185
(Continued)

FOREIGN PATENT DOCUMENTS

DE 102017211943 A1 1/2019
EP 2516864 A1 10/2012
(Continued)

OTHER PUBLICATIONS

Knoop, WO2014000867 translation, Jan. 2014 (Year: 2014).*
Bauer Michael, DE102017211943 translation, Jan. 2019 (Year: 2019).*

*Primary Examiner* — Christopher Verdier
*Assistant Examiner* — Michael K. Reitz
(74) *Attorney, Agent, or Firm* — LORENZ & KOPF, LLP

(57) ABSTRACT

A turbocharger includes a housing and a rotating group supported for rotation within the housing. The rotating group includes a compressor wheel disposed within a compressor section of the turbocharger, and the rotating group includes a turbine wheel disposed within a turbine section of the turbocharger. The turbine wheel includes a bleed pressure surface. The turbocharger further includes a bleed passage that extends at least partly through the housing to fluidly connect the compressor section to the turbine section. The bleed passage is configured to direct a bleed flow of fluid from the compressor section to the bleed pressure surface to supply a thrust counterbalance load to the bleed pressure surface.

16 Claims, 3 Drawing Sheets

(51) Int. Cl.
   *F01D 3/04*   (2006.01)
   *F02C 6/12*   (2006.01)
   *F04D 29/22*  (2006.01)

(52) U.S. Cl.
   CPC ............ *F02C 6/12* (2013.01); *F04D 29/2266* (2013.01); *F05D 2220/40* (2013.01); *F05D 2230/60* (2013.01)

(58) Field of Classification Search
   CPC .......... F01D 3/00; F01D 25/168; B23P 15/04; F02C 6/12
   See application file for complete search history.

(56) References Cited

U.S. PATENT DOCUMENTS

| | | | |
|---|---|---|---|
| 4,715,778 A | 12/1987 | Katayama et al. | |
| 4,884,942 A * | 12/1989 | Pennink | F16C 39/04 415/107 |
| 5,791,868 A | 8/1998 | Bosley et al. | |
| 6,616,423 B2 * | 9/2003 | Bosen | F04D 29/0516 417/406 |
| 7,000,306 B2 * | 2/2006 | Rice | F01D 5/048 29/559 |
| 8,113,798 B2 * | 2/2012 | Bosen | F01D 25/168 417/407 |
| 10,876,535 B2 * | 12/2020 | Nagao | F04D 29/284 |
| 2014/0308137 A1 * | 10/2014 | Koenig | F01D 5/34 416/241 B |
| 2016/0298648 A1 | 10/2016 | Graham et al. | |

FOREIGN PATENT DOCUMENTS

| | | |
|---|---|---|
| GB | 2462635 A | 2/2010 |
| JP | 2011202589 A | 10/2011 |
| WO | 2011078680 A1 | 6/2011 |
| WO | 2014000867 A1 | 1/2014 |

* cited by examiner

E-ASSIST TURBOCHARGER WITH BLEED FLUID SYSTEM CONNECTING COMPRESSOR SECTION TO WEB RING OF TURBINE SECTION FOR THRUST LOAD SUPPRESSION

TECHNICAL FIELD

The present disclosure generally relates to turbochargers and, more particularly, relates to an electric-motor-assisted turbocharger with a bleed fluid system connecting the compressor section to a web ring of the turbine section for thrust load suppression.

BACKGROUND

Various systems include a compressor device for supplying compressed fluid to a device. For example, fuel cell systems can include a fuel cell compressor for compressing air that is fed to the fuel cell stack. This can increase operating efficiency of the fuel cell system.

However, conventional compressor devices may suffer from various deficiencies. Operation of some of these devices may be inefficient. Some compressor devices may be too bulky, too heavy, or too complex for some applications. Also, the bearings used in some conventional devices may be the source of problems. Some compressor devices may have a load bearing capacity that limits their usefulness and/or operating efficiency. Furthermore, some bearings may be sources of contamination.

Thus, it is desirable to provide a compressor device that has high operating efficiency. It is also desirable to provide a compressor device that is compact and that is less complex than conventional devices. Also, it is desirable to provide a compressor device with a more reliable and robust bearing. Moreover, it is desirable to provide a compressor device with high load bearing capacity. Other desirable features and characteristics of the present disclosure will become apparent from the subsequent detailed description and the appended claims, taken in conjunction with the accompanying drawings and this background discussion.

BRIEF SUMMARY

In one embodiment, a turbocharger is disclosed that includes a housing and a rotating group supported for rotation within the housing. The rotating group includes a compressor wheel disposed within a compressor section of the turbocharger, and the rotating group includes a turbine wheel disposed within a turbine section of the turbocharger. The turbine wheel includes a bleed pressure surface. The turbocharger further includes a bleed passage that extends at least partly through the housing to fluidly connect the compressor section to the turbine section. The bleed passage is configured to direct a bleed flow of fluid from the compressor section to the bleed pressure surface to supply a thrust counterbalance load to the bleed pressure surface.

In another embodiment, a method of manufacturing a turbocharger is disclosed. The method includes providing a housing and a rotating group. The method also includes supporting the rotating group within the housing. The rotating group includes a compressor wheel that cooperates with the housing to define a compressor section of the turbocharger. The rotating group includes a turbine wheel that cooperates with the housing to define a turbine section of the turbocharger. The turbine wheel includes a bleed pressure surface. Moreover, the method includes fluidly connecting the compressor section to the turbine section via a bleed passage that extends at least partly through the housing. The bleed passage is configured to direct a bleed flow of fluid from the compressor section to the bleed pressure member to supply a thrust counterbalance load to the bleed pressure surface.

In an additional embodiment, a fuel cell system is disclosed that includes a fuel cell stack and a turbocharger. The turbocharger includes a housing and a rotating group supported for rotation within the housing. The rotating group includes a compressor wheel disposed within a compressor section of the turbocharger, and the rotating group includes a turbine wheel disposed within a turbine section of the turbocharger. The turbine wheel includes a bleed pressure member with a bleed pressure surface. The turbocharger further includes a bleed passage that extends at least partly through the housing to fluidly connect the compressor section to the turbine section. The turbocharger is operatively connected to the fuel cell stack with the compressor section configured to supply a compressed airstream to the fuel cell stack and the turbine section configured to receive an exhaust stream from the fuel cell stack. The bleed passage is configured to direct a bleed flow of fluid from the compressor section to the bleed pressure member to supply a thrust counterbalance load to the bleed pressure surface.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a turbocharger, such as a motorized e-assist turbocharger, with a bleed fluid system having at least one passage that fluidly connects the compressor section to the turbine section. In various embodiments, the turbine section may include a turbine wheel with a bleed pressure member. The bleed pressure member may include at least one radially extending body (e.g., an annular body) that projects radially outward from another portion of the turbine wheel (e.g., from an outer radial area of the hub of the turbine wheel). Thus, the bleed pressure member may provide radial mass to the rotating group at the turbine section. Additionally, the bleed passage may be fluidly connected to the turbine section proximate the bleed pressure member. Thus, bleed fluid may flow toward at least one surface (i.e., a pressure surface) of the bleed pressure member to apply a thrust counterbalancing force to the rotating group. Thrust loads generated during operation of the turbocharger may be counterbalanced by the load on the bleed pressure member for balanced rotation of the rotating group.

Additionally, the compressor may include a relatively simple bearing, such as an air bearing. The features of the present disclosure provide rotodynamic stability (radial and axial) for the air bearing, even in applications with higher air momentum (transmitted machine power). Accordingly, the air bearing can provide cost savings and efficiencies without detrimentally affecting performance.

Methods of operating these turbochargers and methods of manufacturing these turbochargers are also disclosed. According to these methods, operating efficiency and manufacturing efficiency may be increased.

Figure 1:
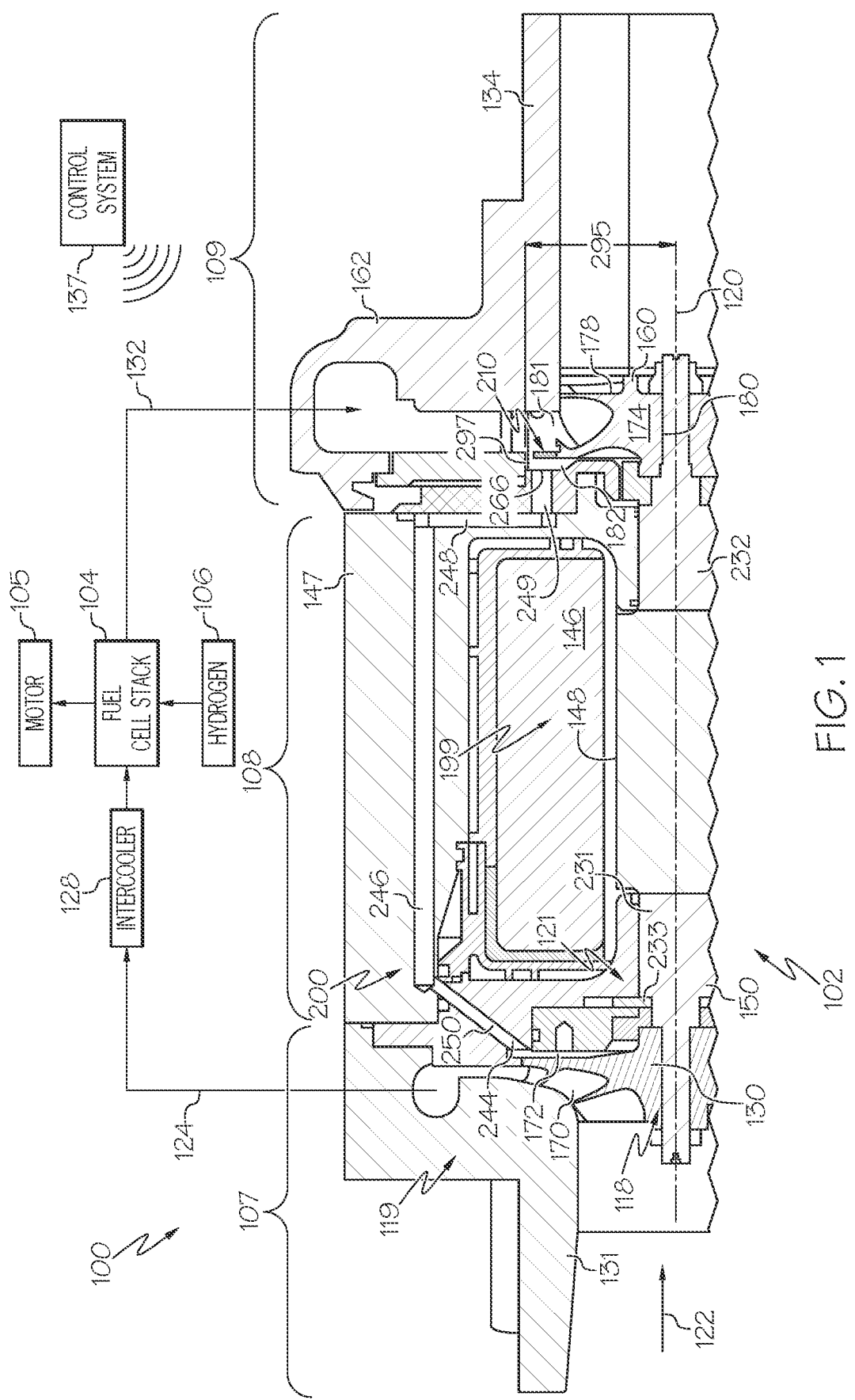
FIG. 1 is an axial cross-sectional view of a turbocharger schematically shown incorporated in a fuel cell system according to example embodiments of the present disclosure.

FIG. 1 is a schematic view of a fuel cell system 100 with an example turbocharger 102 of the present disclosure. In some embodiments, the fuel cell system 100 may be included in a vehicle, such as a car, truck, sport utility vehicle, van, motorcycle, etc. However, it will be appreciated that the fuel cell system 100 may be configured for a different use without departing from the scope of the present disclosure.

The fuel cell system 100 may include a fuel cell stack 104 containing a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an electrical device, such as an electric motor 105. As stated, the fuel cell system 100 may be included in a vehicle; therefore, in some embodiments, the electric motor 105 may convert the electrical power to mechanical power to drive and rotate an axle (and, thus, one or more wheels) of the vehicle.

Oxygen may be provided to the fuel cell stack 104, at least in part, by the turbocharger 102. In some embodiments, exhaust from the fuel cell stack 104 may be directed back toward the turbocharger 102 for providing fluid power thereto. The turbocharger 102 may be configured as an e-assist (i.e., motorized) turbocharger in some embodiments. As such, the turbocharger 102 may include a compressor section 107, a motor section 108, and a turbine section 109.

As shown in FIG. 1, the turbocharger 102 may generally include a rotating group 118 and a housing 119. The rotating group 118 may include a shaft 150 and various other components that are fixedly supported thereon. The rotating group 118 may be supported for rotation about an axis 120 within the housing 119 by one or more bearings 121. In some embodiments, the bearing(s) 121 may be configured as an air bearing (i.e., a plain bearing, an oil-less bearing, etc.).

The motor section 108 of the turbocharger 102 may include an electric motor 199 that includes a stator 146 and a rotor 148. The rotor 148 may be fixed to the shaft 150, and the stator 146 may surround the rotor 148. The stator 146 may be supported and housed within a motor housing 147 of the turbocharger housing 119. During operation, the stator 146 may drivingly rotate the rotor 148, the shaft 150, and other elements of the rotating group 118 about the axis 120.

The compressor section 107 of the turbocharger 102 may include a compressor wheel 130, which may be fixed to a longitudinal end of the shaft 150. The compressor wheel 130 may be supported for rotation within a compressor housing 131 of the turbocharger housing 119. As the rotating group 118 rotates about the axis 120, the compressor wheel 130 may rotate within the compressor housing 131. During operation, an inlet airstream (represented by arrow 122) may be compressed by the compressor section 107, and a compressed airstream (represented by arrow 124) may be directed to an intercooler 128 and then to the fuel cell stack 104 for boosting the operating efficiency of the fuel cell system 100.

The turbine section 109 of the turbocharger 102 may include a turbine wheel 160, which may be fixed to the longitudinal end of the shaft 150 that is opposite the compressor wheel 130. The turbine wheel 160 may be supported for rotation within a turbine housing 162. A high-pressure exhaust gas stream (represented by arrow 132) from the fuel cell stack 104 may be exhausted to the turbine housing 162 and toward the turbine wheel 160. The high-pressure exhaust gas stream 132 may drive rotation of the turbine wheel 160 and, further downstream, may flow through an exhaust pipe 134 as a low-pressure exhaust gas stream 133 to atmosphere.

Various components of the fuel cell system 100 may be controlled by a control system 137. The control system 137 may be a computerized system with a processor, various sensors, and other components for electrically controlling operation of the fuel cell stack 104, the motor 199, and/or other features of the system 100. In some embodiments, the control system 137 may define or may be part of the electrical control unit (ECU) of a vehicle.

Accordingly, during operation, the rotating group 118 may be driven in rotation (by the motor 199 and/or the exhaust gas stream 132) such that the compressor section 107 provides the compressed airstream 124 to the fuel cell stack 104. The exhaust gas stream 132 may be directed back to the turbine section 109 to drive rotation of the rotating group 118. It will be appreciated that the flow of the exhaust gas stream 132 through the turbine section 109 and operation of the motor 199 may cooperate to drive rotation of the rotating group 118. It will be appreciated that, in some operating conditions, the motor 199 is the primary driver and the exhaust gas stream 132 is the secondary driver that assists the motor 199. In other conditions, the exhaust gas stream 132 may be the primary driver and the motor 199 may be secondary driver of the rotating group 118. In further operating conditions, the turbine section 109 or the motor section 108 may operate independently to drive the rotating group 118. In additional embodiments, the turbocharger 102 may be configured differently such that the motor section 108 is omitted and such that the turbocharger 102 includes the compressor section 107 and the turbine section 109.

It will be appreciated that, during operation, aerodynamic loads may be generated, for example, at the compressor section 107. More specifically, an axial thrust load (represented by arrow 203 in FIG. 2) may be generated at the compressor section 107, for example, due to a higher pressure ratio than that of the turbine section 109, due to dimensional differences between the compressor wheel 130 and the turbine wheel 160, etc. The thrust load may tend to shift the rotating group 118 axially along the axis 120. As shown, the axial thrust load 203 may be directed axially toward the compressor housing 131. However, the turbocharger 102 may have various features discussed below that provide a counterbalancing thrust load to the rotating group 118 for more balanced rotation thereof.

Figure 2:
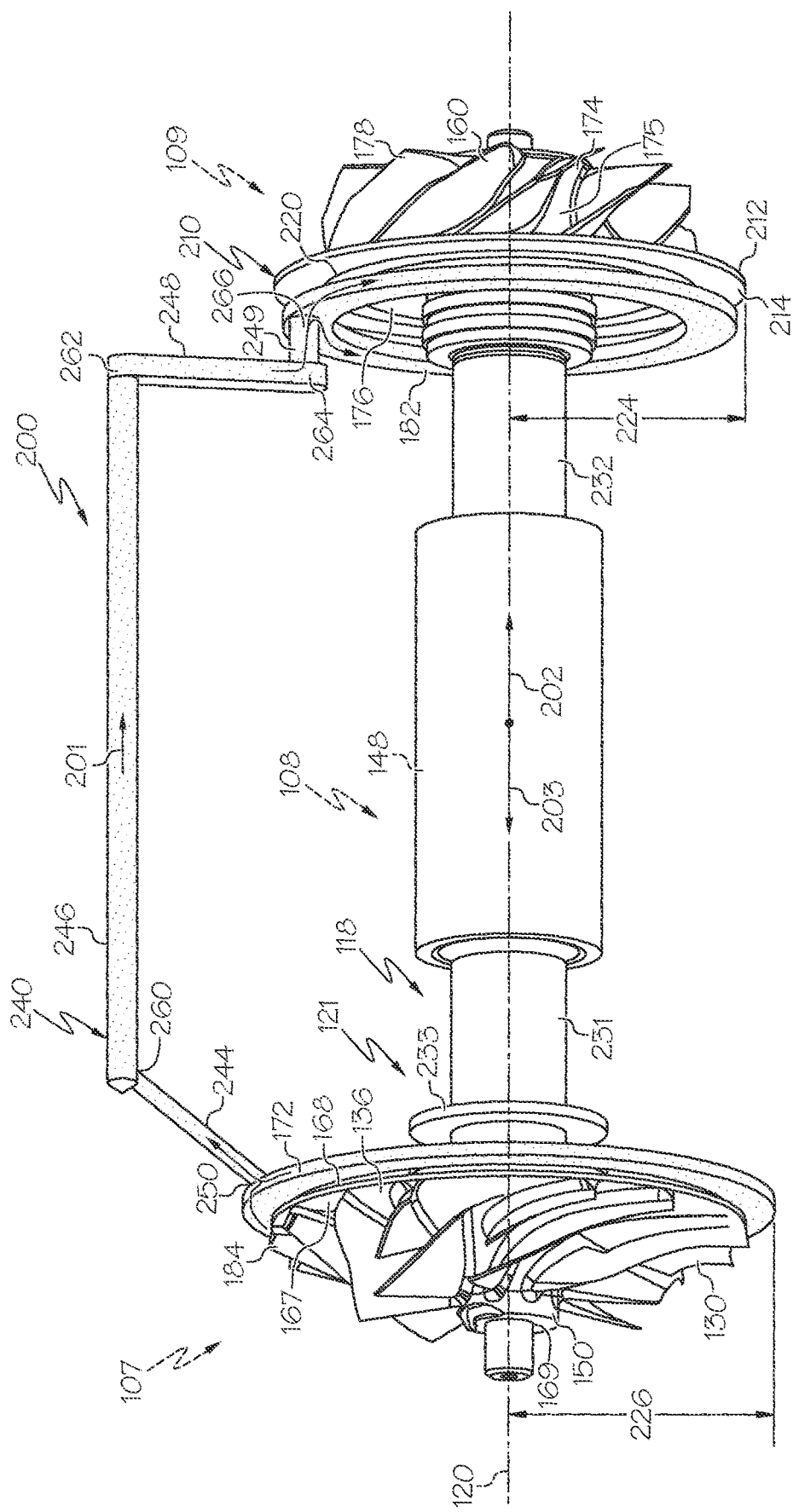
FIG. 2 is an isometric view of a rotating group of the turbocharger of FIG. 1 and a bleed passage fluidly connecting the compressor section to the turbine section thereof.

For example, as shown in FIG. 2, the turbocharger 102 may include a bleed fluid system 200. The bleed fluid system 200 may include one or more fluid passages that fluidly connects the compressor section 107 to the turbine section 109. Generally, the bleed fluid system 200 may direct a bleed flow (represented by arrow 201) from the compressor section 107 to the turbine section 109 to supply a thrust counterbalance load (represented by arrow 202) to the rotating group 118. The thrust counterbalance load 202 may counterbalance the axial thrust load 203 for balanced rotation of the rotating group 118.

The bleed fluid system 200 may be a passive system in some embodiments. More specifically, pressures in the system 200 may self-adjust according to the operating conditions of the turbocharger 102.

Accordingly, the turbocharger 102 may operate efficiently and at high speeds. Also, the bearing(s) 121 included can be less expensive and less complex bearings without detrimentally affecting performance of the turbocharger 102. For example, the bearing 121 may be an air bearing in some embodiments. Also, the turbocharger 102 can be manufactured and repaired inexpensively and in a time-efficient manner because of the features of the present disclosure.

Referring now to FIG. 2, the rotating group 118 and the bleed fluid system 200 of the turbocharger 102 will be discussed in greater detail according to example embodiments. The housing 119 has been hidden for clarity.

As shown, the compressor wheel 130 may include a contoured compressor hub 136 having a front face 167 and a back face 168. The front face 167 may face axially away from the motor section 108, and the back face 168 may face axially toward the motor section 108. The compressor wheel 130 may also include a plurality of blades 184 that project from the front face 167. The compressor wheel 130 may include a bore 169 that receives the shaft 150 to be fixed to one terminal end of the shaft 150. As shown in FIG. 1, the housing 119 may house the compressor wheel 130 with the compressor housing 131 opposing the front face 167 and the blades 184 and with the motor housing 147 opposing the back face 168. Accordingly, the compressor wheel 130 and the compressor housing 131 may cooperatively define a compressor forward space 170, and the compressor wheel 130 and the motor housing 147 may cooperatively define a compressor back space 172. The compressor hub 136 may divide and separate the compressor forward space 170 from the compressor back space 172. The blades 184 may move within the compressor forward space 170 as the compressor wheel 130 rotates about the axis 120. The compressor back space 172 may define part of the bleed fluid system 200 as will be discussed in greater detail below.

Figure 3:
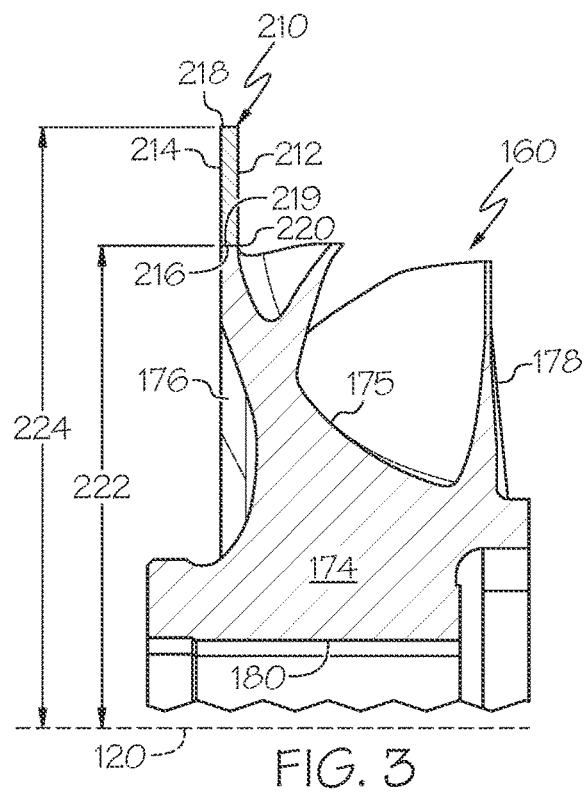
FIG. 3 is an axial cross-sectional view of the turbine section of the turbocharger of FIG. 1 including a bleed pressure member according to example embodiments of the present disclosure.

Furthermore, as shown in FIGS. 1-3, the turbine wheel 160 may include a turbine hub 174 having a front face 175 and a back face 176. The front face 175 may face axially away from the motor section 108, and the back face 176 may face axially toward the motor section 108. The turbine wheel 160 may also include a plurality of blades 178 that project from the front face 175. The turbine wheel 160 may include a bore 180 that receives the shaft 150 to be fixed to the terminal end of the shaft 150.

The turbine wheel 160 may further include a bleed pressure member 210 (i.e., bleed pressure disc, turbine web ring, turbine wheel edge projection, etc.). The bleed pressure member 210 may be annular and flat with a front surface 212 and a back surface 214. The front surface 212 may face axially and away from the motor section 108, whereas the back surface 214 may face axially and toward the motor section 108. In some embodiments, the front and back surfaces 212, 214 may be flat and may lie in respective planes that are perpendicular to the axis 120. A thickness direction of the bleed pressure member 210 may be measured between the front and back surfaces 212, 214. The bleed pressure member 210 may also include an inner radial area 216 (i.e., an inner diameter portion) and an outer radial edge 218 (i.e., an outer diameter portion). The outer radial edge 218 may be circular and may define an outer terminal edge of the turbine wheel 160. The inner radial area 216 may be joined to an outer radial area 219 of the turbine hub 174.

In some embodiments, the bleed pressure member 210 may be fixed to the hub 174 of the turbine wheel 160. Specifically, the inner radial area 216 of the bleed pressure member 210 may be attached to the outer radial area 219 at a fixed joint 220 (FIG. 3). The fixed joint 220 may be a press-fit, interference-fit, frictional fit, adhesively attached, weldment, or other type of fixed attachment. This configuration can advantageously increase manufacturing efficiency for forming the turbine wheel 160. For example, it may be convenient and less expensive to form the bleed pressure member 210 separately from the hub 174 and to subsequently join the two components. Also, this configuration allows the bleed pressure member 210 and the hub 174 to be formed from different materials. For example, in some embodiments, the bleed pressure member 210 may be formed from a polymeric or composite material (e.g., nylon) whereas the hub 174 and blades 178 may be formed from a metallic material (e.g., aluminum alloy). This may benefit operating performance, lower manufacturing costs, etc. In alternative embodiments, the bleed pressure member 210, the hub 174, and the blades 178 may cooperatively define a unitary, one-piece turbine wheel 160. For example, the inner radial area 216 may be integrally attached to the outer radial area 219. In these embodiments, the bleed pressure member 210, the hub 174, the blades 178, and other areas of the turbine wheel 160 may be formed (e.g., via machining, casting, etc.) as a unitary member.

The bleed pressure member 210 may project out radially from the hub 174. The back surface 214 may be flush with the back face 176 of the hub 174 at the joint 220. Also, the front surface 212 may be flush with the front face 175 of the hub 174 at the joint 220. Furthermore, as shown in FIG. 3, the blades 178 may include blade tips that are defined at a first radius 222. The outer radial area 219 of the hub 174 may also be defined at the first radius 222. The bleed pressure member 210 may project outward radially from the outer radial area 219 and the outer radial edge 218 may terminate at a second radius 224.

As shown in FIG. 2, the second radius 224 may be predetermined and selected, for example, according to a compressor outer radius 226. For example, a ratio of the second radius 224 to the compressor outer radius 226 may be approximately 1:1 in some embodiments. However, the dimensions of the bleed pressure member 210 may be tailored, adjusted, selected, etc. according to various factors, such as the dimensions of the compressor wheel 130. The mass, material, and/or other features of the bleed pressure member 210 may be similarly selected according to these factors.

As shown in FIG. 1, the housing 119 may house the turbine wheel 160 with the turbine housing 162 opposing the front face 175 and the blades 178 and with the motor housing 147 opposing the back face 176. Accordingly, the turbine wheel 160 and the turbine housing 162 may cooperatively define a turbine forward space 181, and the turbine wheel 160 and the motor housing 147 may cooperatively define a turbine back space 182. The turbine hub 174 and the bleed pressure member 210 may cooperatively divide and separate the turbine forward space 181 from the turbine back space 182. The second radius 224 (FIG. 3) may also be chosen according to an inner diameter dimension 295 (FIG. 1) of area of the turbine housing 162 opposing the bleed pressure member 210 (i.e., to control the radial dimension of a gap 297 between the bleed pressure member 210 and the turbine housing 162). The blades 178 may move within the turbine forward space 181 as the turbine wheel 160 rotates about the axis 120. The turbine back space 182 may define part of the bleed fluid system 200 as will be discussed in greater detail below.

As mentioned above, and as shown in FIGS. 1 and 2, the bearing 121 of the turbocharger 102 may include and/or may be configured as an air bearing. On the rotating group 118, the bearing 121 may include a first journal bearing member 231 proximate the compressor section 107 and a second journal bearing member 232 proximate the turbine section 109. The bearing 121 may also include a thrust disc 233. The thrust disc 233 may be attached to the shaft 150 proximate the first journal bearing member 231. The journal bearing members 231, 232 may support the rotating group 118 against radial loading. The thrust disc 233 may support the rotating group 118 against axial thrust loading. The bleed fluid system 200 may provide a degree of balancing of the axial thrust loading on the rotating group 118.

The bleed fluid system 200 may include at least one continuous fluid passage (i.e., a bleed passage 240 illustrated in FIG. 2) that extends at least partly through the housing 119 from the compressor section 107, across the motor section 108, to the turbine section 109. In some embodiments, the bleed passage 240 may be subdivided into a plurality of segments that are connected in-series between the compressor back space 172 and the turbine back space 182.

More specifically, as shown in FIG. 2, the bleed passage 240 may include a first segment 244, a second segment 246, a third segment 248, and a fourth segment 249, which are fluidly connected in-series from the compressor back space 172 to the turbine back space 182. At least one of the segments 244, 246, 248, 249 may be linear and axially straight. As represented in FIG. 2, each of the segments 244, 246, 248, 249 may be linear and axially straight. Accordingly, the bleed passage 240 may be compact, and the segments 244, 246, 248, 249 may be formed efficiently (e.g., via a machining process).

The first segment 244 of the bleed passage 240 may extend through the housing 119 at an acute angle relative to the axis 120 to extend from the compressor back space 172 axially away and toward the motor section 108 as well as radially away from the axis 120. Also, a bleed inlet 250 may fluidly connect one end of the first segment 244 to the compressor back space 172.

The second segment 246 of the bleed passage 240 may be spaced radially from the axis 120 and may extend substantially parallel to the axis 120 through the motor housing 147. The second segment 246 may be fluidly connected to the first segment 244 at a first junction 260.

The third segment 248 of the bleed passage 240 may be fluidly connected to the second segment 246 at a second junction 262. In some embodiments, the third segment 248 may extend radially (e.g., normal to the axis 120) through the housing 119. In some embodiments, the third segment 248 may be defined by a gap between two separate parts of the housing 119.

The fourth segment 249 of the bleed passage 240 may be fluidly connected to the third segment 248 at a third junction 264. In some embodiments, the fourth segment 249 may extend substantially parallel to the axis 120 and may be spaced radially from the axis 120. Also, a bleed outlet 266 may fluidly connect the fourth segment 249 to the turbine back space 182.

Accordingly, during operation of the turbocharger 102, a portion of the inlet airstream 122 (FIG. 1) may flow around the outer radial edge of the compressor wheel 130, into the annular compressor back space 172, and into the bleed passage 240 via the bleed inlet 250. This bleed flow 201 may flow through the first segment 244, then through the second segment 246, subsequently through the third segment 248, and next through the fourth segment 249 to the annular turbine back space 182 before flowing around the outer radial edge 218 and into the primary flow path of the turbine section 109 and out the exhaust pipe 134.

The bleed flow may be directed via the system 200 to the bleed pressure member 210. Fluid pressure of the bleed flow may exert an axial load against the back surface 214 (i.e., the bleed pressure surface) of the bleed pressure member 210. This axial load on the bleed pressure member 210 may provide the thrust counterbalance load 202, which counterbalances the axial thrust load 203. As such, thrust loads on the thrust disc 233 can be reduced and the rotating group 118 may rotate in a balanced manner across a range of operating conditions (i.e., different rotational speeds, etc.).

Figure 4:
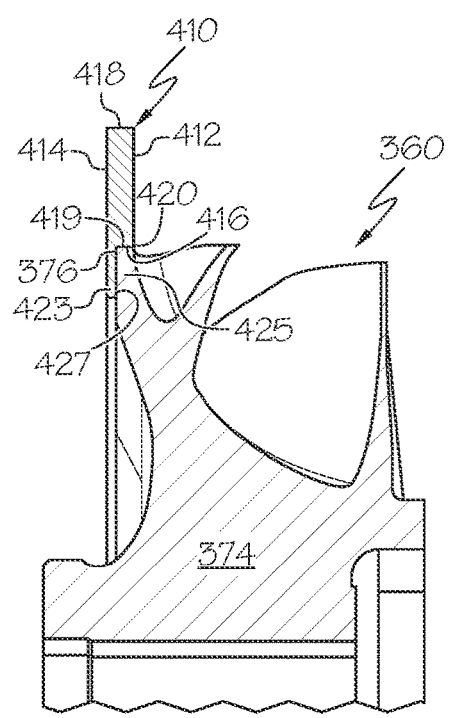
FIG. 4 is an axial cross-sectional view of the turbine section including the bleed pressure member according to additional example embodiments of the present disclosure.

Referring now to FIG. 4, the turbine wheel 360 and the bleed pressure member 410 are illustrated according to additional embodiments of the present disclosure. The turbine wheel 360 and the bleed pressure member 410 may be similar to the embodiments of FIG. 3 except as noted and may be included with the other components of the rotating group 118 of FIGS. 1 and 2. Components that correspond to those of FIG. 3 are indicated with corresponding reference numbers increased by 200.

The bleed pressure member 410 of FIG. 4 may be annular. The bleed pressure member 410 may have a stepped and/or a P-shaped cross-sectional profile. As such, the bleed pressure member 410 may include the back surface 414, the front surface 412, and the outer radial edge 418. The inner radial area 416 of the bleed pressure member 410 may include a radial projection 423 that projects radially inward to define a step 425.

The outer radial area 419 of the hub 374 may be fixedly attached to the inner radial area 416 of the bleed pressure member 410. The outer radial area 419 may be received within the step 425 of the bleed pressure member 410. Accordingly, there may be a frictional fit, a press-fit, or other type of fixed joint 420 between the inner radial area 416 and the outer radial area 419. In addition, the axially-facing back face 376 of the hub 374 may mate and abut against an opposing axial surface 427 of the projection 423 of the bleed pressure member 410. As mentioned, the hub 374 and the bleed pressure member 410 may be pressed together. As these components are joined, the hub 374 may be axially advanced into the bleed pressure member 410 until the axial surface 427 abuts against the back face 376. Thus, the axial surface 427 may provide a control surface for controlling axial positioning of the hub 374 relative to the bleed pressure member 410 for further increasing manufacturing efficiency.

Figure 5:
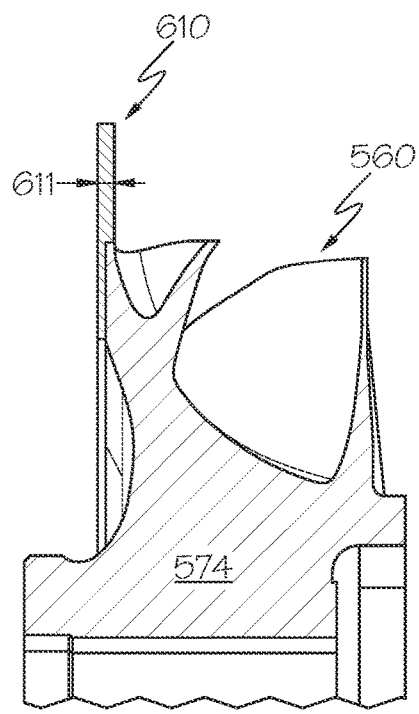
FIG. 5 is an axial cross-sectional view of the turbine section including the bleed pressure member according to additional example embodiments of the present disclosure.

Referring now to FIG. 5, the turbine wheel 560 and the bleed pressure member 610 are illustrated according to additional embodiments of the present disclosure. The turbine wheel 560 and the bleed pressure member 610 may be similar to the embodiments of FIG. 4 except as noted and may be included with the other components of the rotating group 118 of FIGS. 1 and 2. Components that correspond to those of FIG. 4 are indicated with corresponding reference numbers increased by 200.

As shown, the hub 574 and the bleed pressure member 610 may have a thickness 611 that is smaller as compared to the embodiments of FIG. 4. This reduced material thickness may lower manufacturing costs. The reduced thickness may also benefit operating efficiency.

Figure 6:
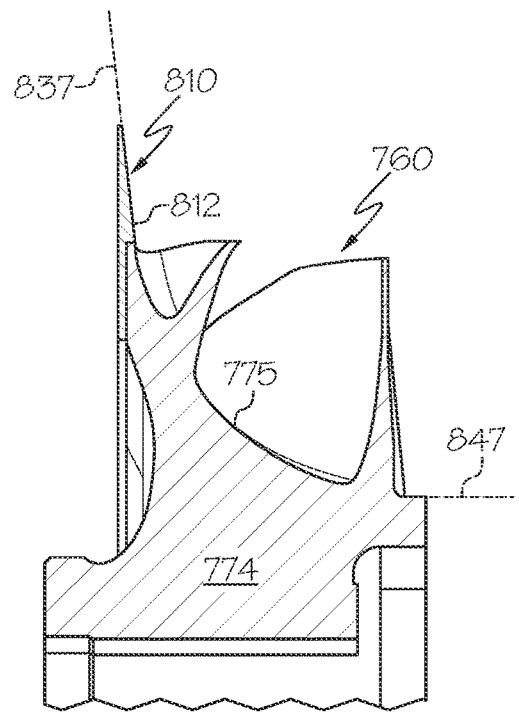
FIG. 6 is an axial cross-sectional view of the turbine section including the bleed pressure member according to additional example embodiments of the present disclosure.

Referring now to FIG. 6, the turbine wheel 760 and the bleed pressure member 810 are illustrated according to additional embodiments of the present disclosure. The turbine wheel 760 and the bleed pressure member 810 may be similar to the embodiments of FIG. 5 except as noted and may be included with the other components of the rotating group 118 of FIGS. 1 and 2. Components that correspond to those of FIG. 5 are indicated with corresponding reference numbers increased by 200.

As illustrated, the front surface 812 of the bleed pressure member 810 may be contoured (i.e., non-planar). Also, the bleed pressure member 810 may be attached to the hub 774 such that a contoured profile 837 of the front surface 812 is aligned with the swept, contoured profile 847 of the hub 774. Thus, as illustrated in the cross section of FIG. 6, the transition between the contoured front face 775 of the hub 774 and the contoured front surface 812 of the bleed pressure member 810 may be flush and continuous. The contoured profile 847 of the hub 774 may continue uninterrupted across this transition and may continue alone the profile 837 of the bleed pressure member 810. This arrangement may provide aerodynamic benefits for increased operating efficiency.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A turbocharger comprising:
a housing;
a rotating group supported for rotation within the housing, the rotating group including a compressor wheel disposed within a compressor section of the turbocharger, the rotating group including a turbine wheel disposed within a turbine section of the turbocharger, the turbine wheel including a bleed pressure surface, the turbine wheel including a turbine hub and a plurality of turbine blades that project from the turbine hub, the plurality of turbine blades having a blade tip disposed at a first radius, the turbine hub having an outer radial area disposed at the first radius, the turbine wheel and the housing cooperating to define a turbine forward space and a turbine back space, the plurality of turbine blades supported for rotation within the turbine forward space, the compressor wheel and the housing cooperating to define a compressor forward space and a compressor back space, the compressor wheel including a plurality of compressor blades supported for movement within the compressor forward space;
an electric motor that is operatively connected to the rotating group and that is configured for drivingly rotating the rotating group, the electric motor housed within a motor cavity in the housing;
a bleed passage that extends at least partly through the housing to fluidly connect the compressor section to the turbine section, the bleed passage including a bleed inlet that is fluidly connected to the compressor back space to receive a bleed flow of fluid therefrom, the bleed passage including a bleed outlet to the turbine back space, the bleed passage including a segment that extends through the housing and outside the motor cavity to fluidly connect the bleed inlet and the bleed outlet, the bleed passage configured to direct the bleed flow in a downstream direction from the bleed inlet, through the segment, and to the bleed outlet to supply a thrust counterbalance load to the bleed pressure surface; and
a bleed pressure member radially extending from the outer radial area of the turbine hub and terminating at a second radius that is greater than the first radius, the bleed pressure member including the bleed pressure surface between the first radius and the second radius.

2. The turbocharger of claim 1, further comprising an air bearing that supports the rotating group for rotation within the housing.

3. The turbocharger of claim 1, wherein the bleed pressure member is annular.

4. The turbocharger of claim 1, wherein the bleed pressure member is attached to the turbine hub at a fixed joint.

5. The turbocharger of claim 4, wherein the turbine hub and the bleed pressure member are made from different materials.

6. The turbocharger of claim 4, wherein the bleed pressure member includes an inner radial area, and wherein the fixed joint attaches the outer radial area and the inner radial area.

7. The turbocharger of claim 6, wherein the turbine hub includes a hub axial surface, wherein the bleed pressure member includes an opposing axial surface, and wherein the hub axial surface is mated against the opposing axial surface.

8. The turbocharger of claim 1, wherein the turbine hub defines a contoured hub profile, and wherein the bleed pressure member includes a contoured front surface with a first contoured profile that is aligned with the contoured hub profile.

9. The turbocharger of claim 1, wherein the segment is one of a plurality of linear and straight segments of the bleed passage, the plurality of linear and straight segments being connected in-series between the compressor back space and the turbine back space.

10. A method of manufacturing a turbocharger comprising:
providing a housing and a rotating group; and
supporting the rotating group within the housing, the rotating group including a compressor wheel that cooperates with the housing to define a compressor section of the turbocharger, the rotating group including a turbine wheel that cooperates with the housing to define a turbine section, the turbine wheel including a bleed pressure surface, the turbine wheel including a turbine hub and a plurality of turbine blades that project from the turbine hub, the plurality of turbine blades having a blade tip disposed at a first radius, the turbine hub having an outer radial area disposed at the first radius, the turbine wheel including a bleed pressure member radially extending from the outer radial area of the turbine hub and terminating at a second radius that is greater than the first radius, the bleed pressure member including the bleed pressure surface between the first radius and the second radius, the turbine wheel and the housing cooperating to define a turbine forward space and a turbine back space, the plurality of turbine blades supported for rotation within the turbine forward space, the compressor wheel and the housing cooperating to define a compressor forward space and a compressor back space, the compressor wheel including a plurality of compressor blades supported for movement within the compressor forward space;

housing an electric motor within a motor cavity of the housing, and operatively connecting the electric motor to the rotating group, the electric motor configured for drivingly rotating the rotating group;

fluidly connecting the compressor section to the turbine section via a bleed passage that extends at least partly through the housing, the bleed passage including a bleed inlet that is fluidly connected to the compressor back space to receive a bleed flow of fluid therefrom, the bleed passage including a bleed outlet to the turbine back space, the bleed passage including a segment that extends through the housing and outside the motor cavity to fluidly connect the bleed inlet and the bleed outlet, the bleed passage configured to direct the bleed flow in a downstream direction from the bleed inlet, through the segment, and to the bleed outlet to supply a thrust counterbalance load to the bleed pressure surface.

11. The method of claim 10, further comprising fixedly attaching the bleed pressure member to the turbine hub at a fixed joint with the bleed pressure member radially extending therefrom.

12. The method of claim 11, wherein fixedly attaching the bleed pressure member to the turbine hub includes press fitting the bleed pressure member to the turbine hub.

13. The method of claim 12, wherein the turbine hub includes a hub axial surface, wherein the bleed pressure member includes an opposing axial surface; and
   wherein the hub axial surface is mated against the opposing axial surface.

14. The method of claim 11, wherein the turbine hub and the bleed pressure member are made from different materials.

15. The method of claim 10, wherein the turbine hub defines a contoured hub profile, and wherein the bleed pressure member includes a contoured front surface with a first contoured profile; and
   wherein fixedly attaching the bleed pressure member to the turbine hub includes fixedly attaching the bleed pressure member with the first contoured profile aligned with the contoured hub profile.

16. A fuel cell system comprising:
a fuel cell stack; and
a turbocharger including:
   a housing;
   a rotating group supported for rotation within the housing, the rotating group including a compressor wheel disposed within a compressor section of the turbocharger, the rotating group including a turbine wheel disposed within a turbine section of the turbocharger, the turbine wheel including a turbine hub and a plurality of turbine blades that project from the turbine hub, the plurality of turbine blades having a blade tip disposed at a first radius, the turbine hub having an outer radial area disposed at the first radius, the turbine wheel including a bleed pressure member with a bleed pressure surface, the bleed pressure member radially extending from the outer radial area of the turbine hub and terminating at a second radius that is greater than the first radius, the bleed pressure member including the bleed pressure surface between the first radius and the second radius, the turbine wheel and the housing cooperating to define a turbine forward space and a turbine back space, the plurality of turbine blades supported for rotation within the turbine forward space, the compressor wheel and the housing cooperating to define a compressor forward space and a compressor back space, the compressor wheel including a plurality of compressor blades supported for movement within the compressor forward space;
   an electric motor that is operatively connected to the rotating group and that is configured for drivingly rotating the rotating group, the electric motor housed within a motor cavity in the housing; and
   a bleed passage that extends at least partly through the housing to fluidly connect the compressor section to the turbine section, the bleed passage including a bleed inlet that is fluidly connected to the compressor back space to receive a bleed flow of fluid therefrom, the bleed passage including a bleed outlet to the turbine back space;
the bleed passage including a segment that extends through the housing and outside the motor cavity to fluidly connect the bleed inlet and the bleed outlet;
the turbocharger operatively connected to the fuel cell stack with the compressor section configured to supply a compressed airstream to the fuel cell stack and the turbine section configured to receive an exhaust stream from the fuel cell stack;
the bleed passage configured to direct the bleed flow in a downstream direction from the bleed inlet, through the segment, and to the bleed outlet to supply a thrust counterbalance load to the bleed pressure surface.

\* \* \* \* \*